W. P. HALLIDAY.
Method of Removing Calcareous Deposits from the Exterior of Tubes in Salt Apparatus.
No. 167,524.　　　　　　　　　　Patented Sept. 7, 1875.
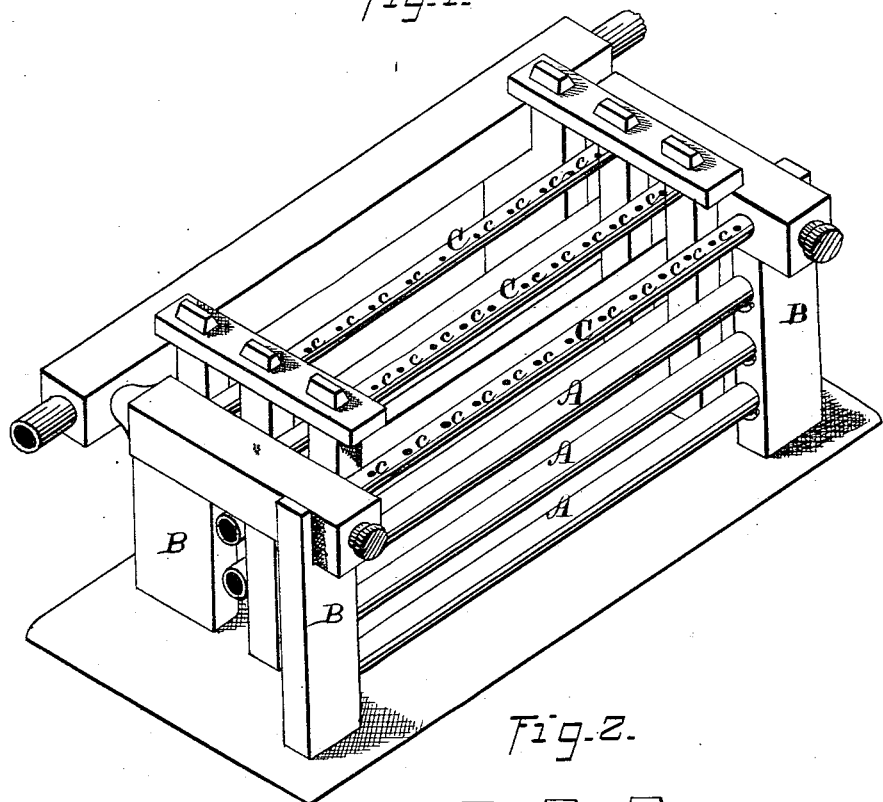
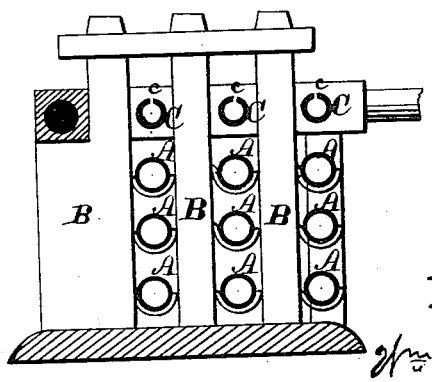

UNITED STATES PATENT OFFICE.

WILLIAM P. HALLIDAY, OF CAIRO, ILLINOIS.

IMPROVEMENT IN METHODS OF REMOVING CALCAREOUS DEPOSITS FROM THE EXTERIOR OF TUBES IN SALT APPARATUS.

Specification forming part of Letters Patent No. 167,524, dated September 7, 1875; application filed June 29, 1875.

*To all whom it may concern:*

Be it known that I, WILLIAM P. HALLIDAY, of Cairo, in the county of Alexander and in the State of Illinois, have invented certain new and useful Improvements in the Method of and Apparatus for Removing Calcareous Deposits from Tubes used in the Manufacture of Salt; and do hereby declare that the following is a full, clear, and exact description thereof, reference being had to the accompanying drawings making a part of this specification, in which—

Figure 1 is a perspective view of my apparatus as arranged for use, and Fig. 2 is a vertical cross-section of the same.

Letters of like name and kind refer to like parts in each of the figures.

In the manufacture of salt, and in other like operations, in which a liquid is evaporated by means of steam-pipes immersed within or passing through the same, much difficulty is experienced from the deposit of sulphate of lime or other calcareous material upon the exterior of each pipe, such deposit being a poor conductor of heat and requiring frequent removal.

To remove such deposit without injury to the pipes, and with greater dispatch than has heretofore been practicable, is the design of my invention, which consists in the method employed for the removal of calcareous or other deposit from pipes or tubes by means of water sprayed or dripped upon their exteriors, substantially as is hereinafter specified.

In the use of my invention the pipes or tubes A and A to be cleaned are removed from position and placed within a suitable rack or frame, B, which is so constructed as to enable said pipes to be arranged in vertical tiers, as shown in the annexed drawing. Above each tier of pipes A and A is placed a smaller pipe, C, which is provided at its upper side with a row of small perforations, $c$ $c$, and at its ends is connected with a water-supply, so that water may be admitted to its interior, and, escaping through said perforations, may drip upon said pipes, said water falling successively upon the latter from the highest to the lowest.

It is found that by thus dripping water upon the pipes all deposits upon their exteriors will be dissolved and removed, the time required for such removal corresponding to the amount of deposit, usually from twelve to twenty-four hours.

By this process the tubes may be entirely cleaned without sustaining injury, while by the method usually employed—breaking and chipping off the deposit with some metal instrument—serious injury often results.

While the dripping of water is preferred, it may be sprayed, or brought into contact with the pipes in any other desired manner.

Having thus fully set forth the nature and merits of my invention, what I claim as new is—

The hereinbefore-described method of removing calcareous or other deposit from the exterior of tubes by means of water dripped or sprayed upon the same, substantially as specified.

In testimony that I claim the foregoing I have hereunto set my hand.

WILLIAM P. HALLIDAY.

Witnesses:
   J. MARTIN,
   W. H. MORRIS.